No. 843,090. PATENTED FEB. 5, 1907.
W. L. MORROW.
DOUBLE CRANK JOINT.
APPLICATION FILED MAR. 22, 1906.
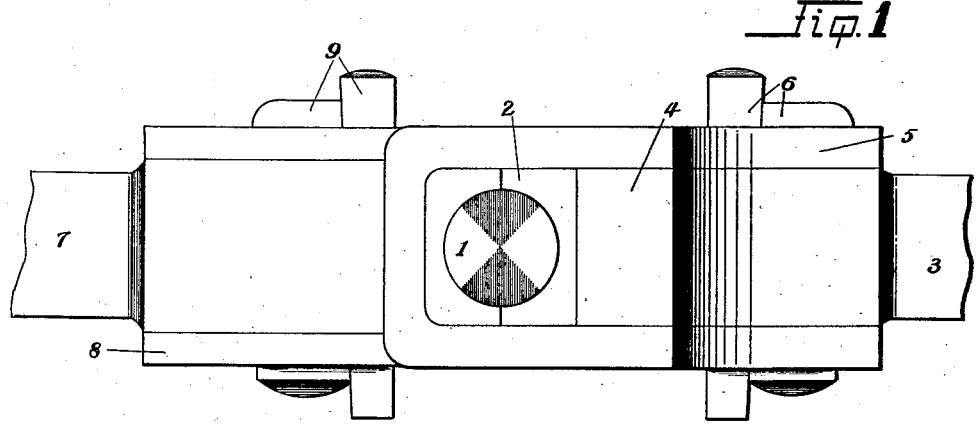
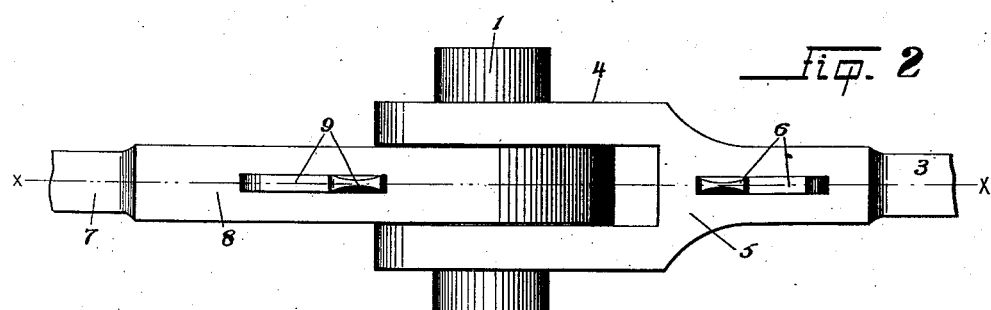
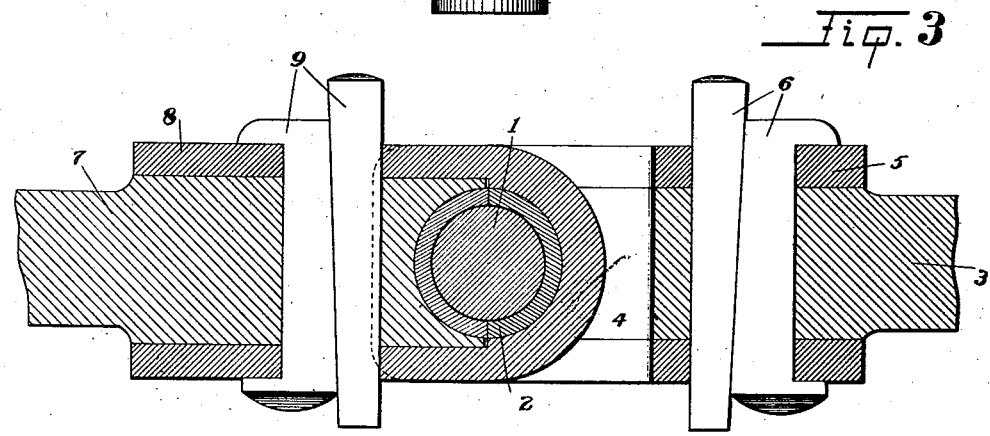
Witnesses
Frank H. Carter.
Percy S. Webster.
Inventor
William L. Morrow.
By Joshua B. Webster
Attorney

UNITED STATES PATENT OFFICE.

WILLIAM L. MORROW, OF STOCKTON, CALIFORNIA.

DOUBLE-CRANK JOINT.

No. 843,090.　　　　　　Specification of Letters Patent.　　　　　　Patented Feb. 5, 1907.

Application filed March 22, 1906. Serial No. 307,327.

*To all whom it may concern:*

Be it known that I, WILLIAM L. MORROW, a citizen of the United States, and a resident of Stockton, in the county of San Joaquin and State of California, have invented certain new and useful Improvements in Double-Crank Joints; and I do declare the following to be a full, clear, and exact description of the same, such as will enable others skilled in the art to which it appertains to make and use the same, reference being had to the accompanying drawings, and the characters of reference marked thereon, which form a part of this specification.

This invention relates to a double-crank joint, and particularly to that class used in connection with double two-cycle engines; and it consists in the new and peculiar bearings and in such other arrangement and construction of parts as appears by the following specification, my object being to produce a compact joint, yet one which will have a sufficient and stable bearing and a minimum friction.

In the drawings similar characters of reference indicate corresponding parts in all the views.

Figure 1 designates a side elevation of my improved device. Fig. 2 is a top plan view of the same. Fig. 3 is a section taken on a line $xx$ of Fig. 2.

1 designates the crank-shaft, and 2 the brass bearing-box thereof.

3 is one pitman or connecting rod provided with a Y 4, secured against the box 2 by means of a collar 5, the same being tightened by means of the usual keys 6.

7 represents the other pitman or connecting rod, said pitman-rod being disposed between the furcations of the first-named pitman-rod and having its outer faces in contact with the inner faces of the furcations of the pitman or connecting rod 3 and encircling and bearing on the outside of the box 2 by means of a collar 8 and tightened thereon by means of the usual keys 9, said box being made cylindrical between the sides of the Y 4 for this purpose.

Thus it is seen I have produced a double-crank joint which does away with the necessity of having the bearings side by side; but instead thereof I have a bearing within a bearing, thus permitting the joint to be compact and less cumbersome than is now the case and to also work on a dead-center line, as shown.

I have now entered into a description of my invention which describes the present and preferred embodiment thereof.

Many changes may of course be made in the details of construction without departing from the principle involved and covered by my claim.

Having thus described the device, I now claim as new and useful and desire to protect by Letters Patent the following claim:

In a double-crank shaft, the crank, a bifurcated pitman or connecting rod, a semicircular brass bearing carried by said pitman or connecting rod, a second pitman or connecting rod fitting between the furcations of the first-named pitman or connecting rod, a semicircular brass bearing carried by said second-named pitman or connecting-rod, the outer faces of the second-named pitman or connecting rod bearing against the inner faces of the furcations of the first-named pitman or connecting rod thereby forming a bearing for the outer faces of the second-named pitman or connecting rod and keys for tightening each of the pitmen or connecting rods on said shaft.

In testimony whereof I affix my signature in presence of two witnesses.

WILLIAM L. MORROW.

Witnesses:
　PERCY S. WEBSTER,
　FRANK E. HOLTON.